Aug. 4, 1931. C. E. GLESSNER 1,817,074
AIRCRAFT CONTROL
Filed Oct. 17, 1928 2 Sheets-Sheet 1
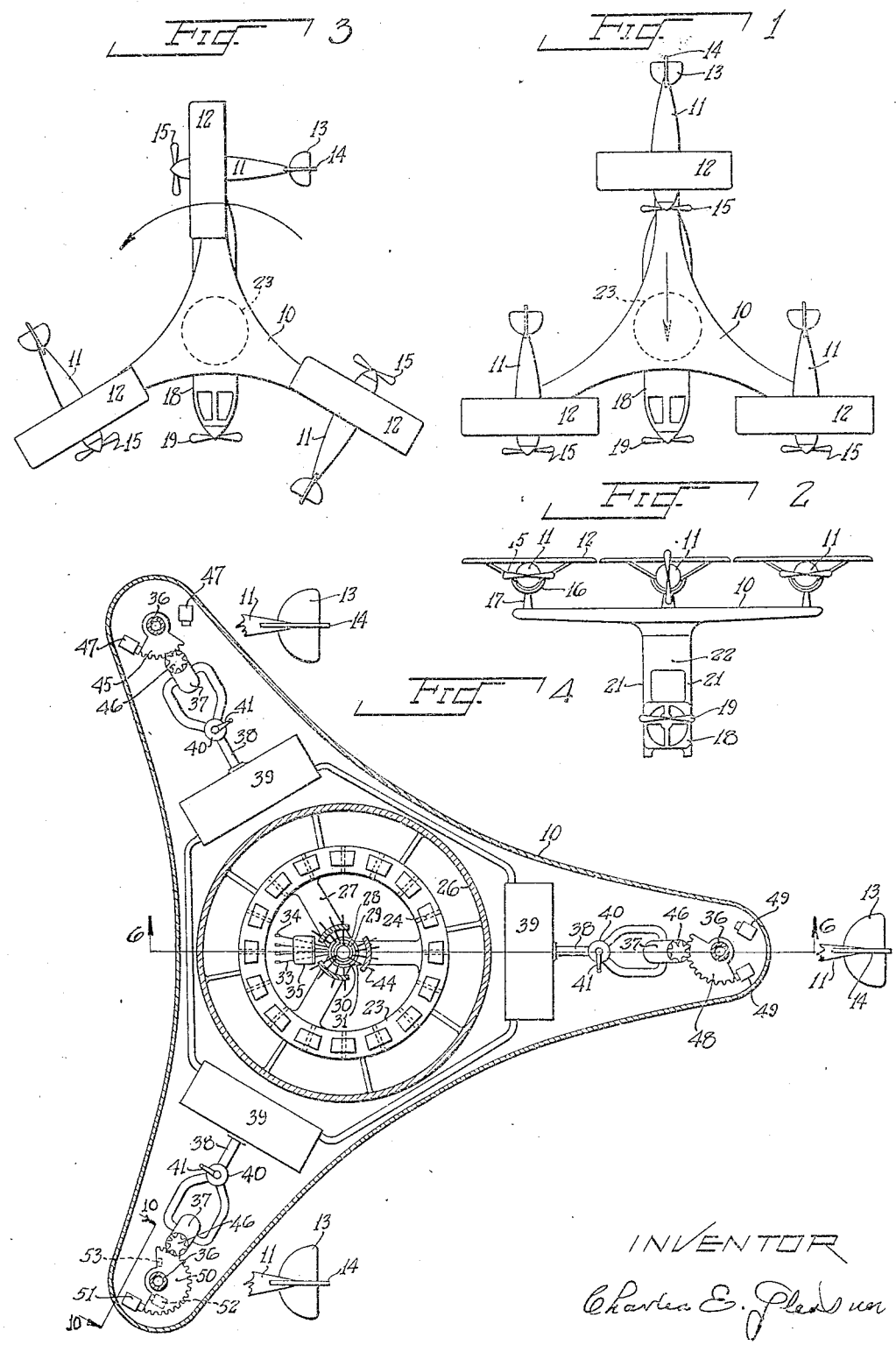
INVENTOR
Charles E. Glessner Aug. 4, 1931.   C. E. GLESSNER   1,817,074
AIRCRAFT CONTROL
Filed Oct. 17, 1928   2 Sheets-Sheet 2
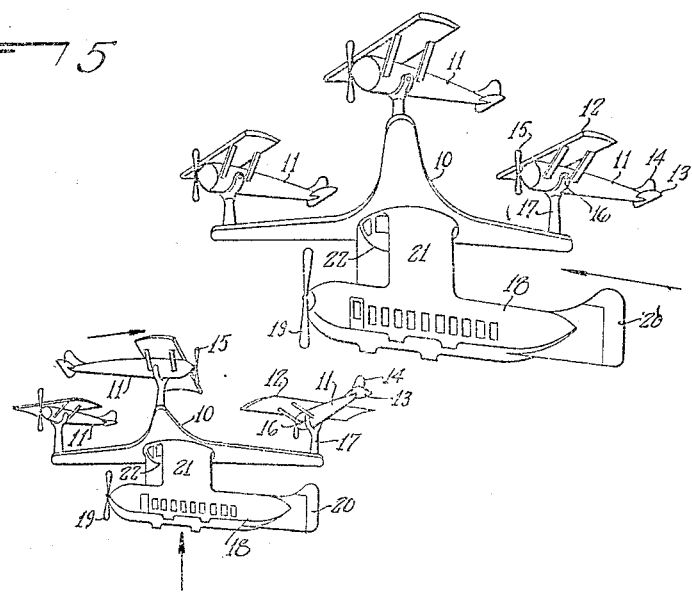
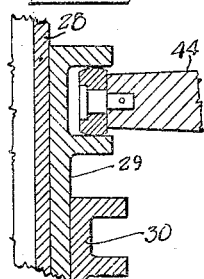
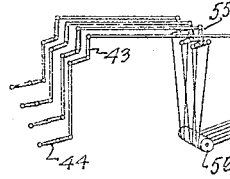
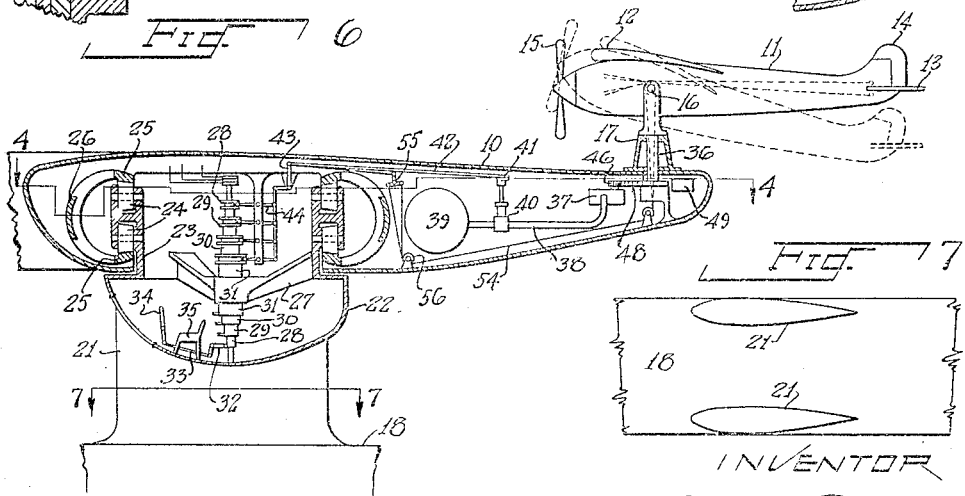
INVENTOR
Charles E. Glessner Patented Aug. 4, 1931

1,817,074

UNITED STATES PATENT OFFICE

CHARLES E. GLESSNER, OF PORTLAND, OREGON

AIRCRAFT CONTROL

Application filed October 17, 1928. Serial No. 313,071.

This invention relates generally to aeronautics, and particularly to a special form of control for air crafts, with special reference to that type of craft described in my United States Patents numbered 1,546,442 and 1,546,443, dated July 21, 1925.

The main object of this invention is to provide a central control for the various units.

The second object is to simplify the flying of this type of craft.

The third object is to reduce the number of men required for a crew.

The fourth object is to increase the pay load by decreasing the amount of equipment and number of crew.

These, and other objects, will become more apparent from the specification following as illustrated in the accompanying drawings, in which:

Figure 1 is a plan of the craft showing its units in a flying position. Figure 2 is a front elevation of Figure 1. Figure 3 is a view similar to Figure 1 but showing the units in a take-off or landing position. Figure 4 is a section taken along the line 4—4 in Figure 6. Figure 5 is a perspective view showing two planes, one in flight and the other one rising. Figure 6 is a section taken along the line 6—6 in Figure 4. Figure 7 is a section taken along the line 7—7 in Figure 6. Figure 8 is a perspective view of a control. Figure 9 is an enlarged section through a portion of the central control. Figure 10 is a fragmentary elevation showing the two sets of resilient stops on one segment gear taken along the line 10—10 in Figure 4.

Similar numbers of reference refer to similar parts throughout the several views.

Referring in detail to the drawings there is illustrated a three armed rotatable frame 10 on whose ends are mounted the airplane units 11 provided with the wings 12, elevators 13, rudders 14 and propellers 15 similiar to those in common use. Each unit 11 is provided with trunnion mountings 16 which are rotatably carried on the support 17 which is secured on the upper side of the frame 10. Under the center of the frame 10 is suspended the ship's cabin 18, which may also be provided with a propeller 19 and rudder 20.

The frame 10 is rotatable with relation to the cabin 18, and this relation is secured by attaching the uprights 21 which project from the top side of the cabin 18 to the under side of the pilot house 22, whose turret 23 is provided with a plurality of rollers 24 which bear against the circular track 25 within the auxiliary frame 26, which is securely attached to the frame 10. Within the turret 23 are the radial arms 27 in which journal the telescopic sleeves 28, 29, 30 and 31. The sleeve 28 and its attached parts operates the controls for the elevator 13. The sleeve 29 operates the controls for the valve 40 which causes the individual airplane units to rotate about its vertical axis, namely the spindle 36. The sleeve 30 controls the starting mechanism (not shown), and the sleeve 31 controls the fuel and ignition of the motor itself. The precise manner of accomplishing all of these objects is shown only diagrammatically in two cases, one in which a push rod 42 is employed for operating the valve 40, and the other in which the cables 54 are employed for operating the elevator, starter and engine controls. Sliding motion is imparted to each sleeve 28 to 31 by means of a bell crank lever 32 which is joined by a link 33 to a hand control lever 34. Naturally there is one hand control lever for each sleeve 28 to 31, although in Figure 6 only one lever 34 is shown, the rest being broken away in order to avoid confusion. The pilot's seat 35 is also indicated.

Each airplane unit 11 is rotated on a vertical spindle 36 by means of an air motor 37 to which air is supplied through a pipe 38 from a tank 39 under the control of a valve 40, which valve is controlled by a lever 41 whose operating rod 42 is attached to a bell crank lever 43 connected by the levers 44 to the upper end of its respective sleeve 28, so that a movement of one of the levers 34 will rock the lever 41 which will set the valve 40 to a forward, neutral or reverse position. The valve 40 is of the ordinary three-way variety which is well understood by the average mechanic.

Turning now to Figure 4, it will be seen that the various units 11 are set in a direction of forward flight and that the various vertical spindles 36 must be rotated different amounts in order to have the various units 11 occupy the positions shown in Figure 3, namely that of taking off or landing. To one spindle 36 is attached a segment gear 45 which meshes with a pinion 46 on the motor 37. The movement of the gear 45 is limited in both directions by the resilient stops 47, which may be of any desired type, and confine the movement of the gear 45 to thirty degrees.

A second spindle 36 carries a segment gear 48 having more teeth than the gear 45 and meshing with a pinion 46 on the motor 37. The gear 48 is limited in its movement to ninety degrees of rotation by the resilient stops 49.

A third spindle 36 carries a segment gear 50 which has more teeth than the gear 48 and meshes with the pinion 46 on the motor 37. The gear 50 is limited to one hundred fifty degrees of rotation by means of the resilient stop 51 which lies in the plane of the gear 50 and the stop 52 which is below the gear 50 and engages a lug 53 which is secured to the gear 50 (as shown in Figure 10).

It will be noted that the sleeves 28 to 31 are on the axis of rotation between the frame 10 and the cabin 18 and that this position makes it possible to transfer the motion between the various sleeves 28 to 31 and the levers 44 at the opposite end thereof.

The elevators 13, rudders 14 and other necessary controls are obtained by the cables 54 whose ends are secured to the rock levers 55 which are operated in the same manner as is operated the valve 40, namely through the hand lever 34. Obviously, suitable rollers or sheaves 56 must be provided for the cables 54.

It will also be noted that in Figure 4 the direction of rotation of the various spindles 36 is not uniform, in order that the various units may change their relation from a circular path to a straight line by traversing the shortest possible circular route; it being noted that one unit turns only thirty degrees, while the second turns ninety and the third one hundred fifty.

It will also be clear to anyone that numerous forms of mechanisms may be employed for controlling the maneuvers of the various units from a central position on the ship, the type illustrated having been selected as best adapted for the purpose, both from a point of operation and illustration.

It will be seen that by this construction only one pilot is required to maneuver the ship, and that the movements of the individual units are so synchronized as to render the ship's control a very simple matter.

It will also be seen that it would be difficult for a human being to occupy one of the units 11, when it is borne in mind that the lift of this ship is dependent upon its units traversing a circular path at a flying speed, which would make the centrifugal action very great. It is understood, of course, that the passengers ride in the cabin 18 which does not rotate in the air, whereas the frame 10 rotates with relation to the cabin 18, and the various units 11 are themselves capable of rotating with relation to the frame 10.

It is obvious that the craft secures its great stability from the gyratory action of the frame 10 which is revolving while taking off and while making a landing; whereas in flight stability is provided by the uniformly distributed lifting action of the planes about its gyratory axis and the low center of gravity caused by the under-slung position of the cabin.

It can be seen that by this arrangement of controls there is a complete unison of action between the various units all working together to stabilize the ship in a most ideal manner.

I claim:

1. A central control for air craft provided with a plurality of airplane units adapted to rotate around a common upright axis consisting in combination of a series of telescoping slides mounted along said axis of rotation, means at one end of each of said slides for manually operating same, and connecting means at the opposite ends of each of said slides connected to the controls of said units adapted to control the flight conditions thereof.

2. A central control for air craft provided with a plurality of airplane units adapted to be flown in a circular orbit or in a straight-away direction consisting of a plurality of controls and operating connections between each airplane unit, a central piloting position, each of said controls having a portion thereof passing along the axis of rotation of said ship and the axis of rotation of its respective airplane unit, and means for revolving the respective units on their vertical axes simultaneously in a manner to cause the first unit to move one third as far as the second unit and one fifth as far as the third unit.

3. A flying machine having three airplane units disposed around a normally vertical axis, each of said units having means for rotating same in a horizontal plane relative to the remaining units in a manner that the first unit shall be rotated one third as much as the second unit and one fifth as much as the third unit.

4. A control for flying machines having in combination a frame adapted to rotate about a vertical axis, said frame having disposed about the periphery thereof three equi-distant upright spindles, gearing for rotating said spindles, a prime mover for driving said gearing, and stop means whereby one of said spindles shall be limited in its rotation to one third the movement of a second spindle and one fifth the movement of the third spindle.

5. A flying machine having in combination a central control station, a plurality of separate airplane units disposed around said station, each of said units having a rotatable mounting whereby its direction with relation to the remaining units can be varied, the capacity of said units to rotate varying in the angular ratio of one, three and five for the purpose of enabling the respective units to assume a common position in which all of the wings are in parallel as in forward flight or a radial position about a common central axis for circular flight, and means operable from the vicinity of said vertical axis for varying the vertical inclination of the individual units simultaneously.

CHARLES E. GLESSNER.